Nov. 12, 1968 R. A. PHILLIPS 3,411,108
STARTING CIRCUITS FOR MAGNETIC CORE VOLTAGE
INVERTER SYSTEMS
Filed Feb. 2, 1967

INVENTOR.
Robert A. Phillips

BY

ATTYS.

United States Patent Office 3,411,108
Patented Nov. 12, 1968

3,411,108
STARTING CIRCUITS FOR MAGNETIC CORE
VOLTAGE INVERTER SYSTEMS
Robert A. Phillips, Scottsdale, Ariz., assignor to Motorola,
Inc., Franklin Park, Ill., a corporation of Illinois
Filed Feb. 2, 1967, Ser. No. 613,564
2 Claims. (Cl. 331—113)

ABSTRACT OF THE DISCLOSURE

A plurality of starting circuits for two-transformer transistorized inverter circuits which do not load the power supply during inverter operation. Speed-up capacitors, SCR's and negative resistance devices are used to start a transistorized inverter.

---

This invention relates to starting circuits for semiconductor voltage inverter circuits, and particularly to starter circuits for inverter circuits utilizing two cores including feedback between the cores and transistors.

Voltage inverters are widely used to convert from DC to AC. Such inverter circuits are characterized by recurrent switching of current conduction states of various components and alternately saturating magnetic transformers between their opposite magnetic polarities or states. Such circuits include feedback means for sustaining such recurrent switching or oscillations and which may either be related to the current amplitude output or the voltage amplitude output. Such arrangements are well known.

Various forms of inverter circuits have different operating and starting characteristics. For example, those inverters utilizing current feedback operate satisfactorily with high current amplitude output, but with small amplitude current output do not always reliably oscillate, and are difficult to start. Further, it is often desired that such inverters start out in the same manner every time they are operated. That is, a particular transistor will always be the first one to conduct a current while a second transistor is always the first one in a current non-conductive state. Usually such inverters will start oscillations with one transistor conducting rather than the other depending on the particular circuit and device characteristics which will vary from one circuit to the next. Also, when the start circuit remains operative after the inverter is operating certain inefficiencies are introduced into inverter operation.

Therefore, it is an object of this present invention to provide a voltage inverter circuit which has positive starting capabilities under most load conditions.

It is another object of this invention to provide an automatic starting circuit in a voltage inverter circuit which is automatically effectively decoupled from the inverter circuit during normal operation of such inverter.

It is a further object of this invention to provide a starter portion of a voltage inverter circuit which operates independently of variations in circuit components, impedances, etc.

According to this invention a very high reactive impedance, such as a small capacitance capacitor, is inserted in a circuit relationship between a base or controlled electrode circuit of a transistor in an inverter circuit and a reference potential. When power is first supplied to the inverter circuit, the capacitor acts to supply the base drive to a connected transistor such that this transistor will always conduct first. The reactive component may be electrically coupled to the base drive circuit of a transistor through a transformer, either saturable or linear type.

Referring now to the accompanying drawings, wherein.

According to this invention transistors or other electro-responsive switch means are connected with a saturable transformer in a regenerative manner such that one winding is connected to the base or control electrode and a second winding is connected to the output portion such that the output portion winding regeneratively couples back into the base or control circuit winding for further changing the conductivity of the electro-responsive switches. A second transformer has a winding connected to the saturable transformer for coupling the output back to the saturable transformer for causing oscillations in the circuit. The output winding is usually on the second transformer. This invention provides a starting circuit for such inverters which is a simple form may consist of a reactive component such as a capacitor, connected between a control portion of one of the transistors and a reference potential within the circuit. Such reference potential may be momentary, such as when the circuit is first starting to oscillate. For example, the reference potential may be provided at a connection between a regenerative winding connected to the output portion of one of the electro-responsive switches and the winding of the output transformer. A second starting circuit connection includes a capacitor connected between the control portion of an electro-responsive switch and the regenerative winding of the other transistor in the inverter. Yet a third connection is provided from the control portion of one of the electro-responsive switches to a voltage on a power source connected to the inverter circuit. Yet a fourth embodiment of this invention is provided by placing a winding on a saturable transformer in series with a capacitor which is then connected across the power supply. When first starting the winding has a transient voltage induced by the capacitor charging up to the power supply voltage. Once the circuit is operating, the power supply is placed directly across the capacitor keeping it fully charged and effectively disconnecting it from the inverter circuit. Additional embodiments include the insertion of SCR, voltage breakover and negative resistance elements cooperating with a capacitor to initiate conduction of a selected transistor switch.

Figure 1:
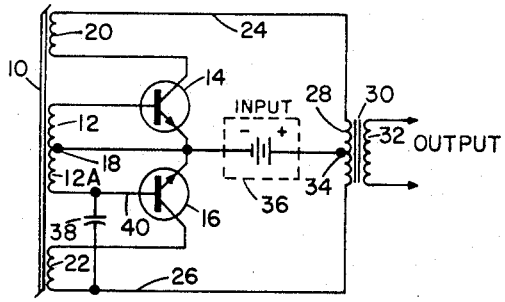
FIG. 1 is a schematic diagram showing one embodiment of the present invention and incorporated into a voltage inverter circuit having current feedback.

Referring now more particularly to the drawings, in the illustrated embodiments, like numbers are used to illustrate like parts and structural features. Referring now to FIG. 1 there is shown a saturable core 10 exhibiting rectangular hysteresis characteristics. On core 10 there is wound a center tap winding 12 having opposite ends connected to the control or base portions of transistor switches 14 and 16. The emitters of the two transistors are commonly connected to center tap 18 of winding 12. Regenerative feedback windings 20 and 22 are respectively connected to the collector electrodes or output portions of transistors 14 and 16. The opposite ends of windings 20 and 22 are respectively connected over feedback lines 24 and 26 to opposing ends of winding 28 which is wound on transformer core 30. It is preferred that transformer core 30 is operated in a linear mode. Output winding 32 is wound on core 30 or alternatively an auto transformer connection may be made with winding 28. Winding 28 is center tapped at 34 and is connected to power supply means 36. The other end of the power supply means 36 is connected to center tap 18 of winding 12 for completing the inverter circuit.

The operation of the circuit is briefly described by first assuming that transistor 14 is conducting current, and transistors 16 is non-conductive. As transistor 14 conducts current, core 10 becomes saturated due to the action of windings 20 and 12, which in turn results in a decrease of output signal amplitude in winding 32. At maximum current conduction through transistor 14, transistor 16 is driven further into current non-conduction. However, when magnetic saturation is reached in core 10, the base drive to transistor 14 is reduced. This action permits the magnetic field of core 10 to collapse inducing base drive voltage in winding 12A for transistor 16. This drive voltage in turn is amplified through the transistor into winding 22 which further drives the magnetic core 10 toward opposing magnetic saturation. The whole circuit is regenerative and quickly transistor 14 stops conducting while transistor 16 begins conducting. When transistor 16 reaches full conduction and the current amplitude is the greatest, the above-described operation is repeated. In this manner the inverter circuit of FIG. 1 oscillates to provide an alternating voltage output through winding 32. It is usual, when a DC voltage is desired, to place a rectifier and a filter (not shown) across winding 32.

This invention adds a reactive component, such as capacitor 38, between the base drive line 40 of transistor 16 and feedback line 26. Capacitor 38 serves when the circuit is first started to keep transistor 14 in a current cut-off stage by first providing base drive to transistor 16 causing it to first conduct current, thereby the circuit always starts in a uniform manner.

In starting the circuit, assume that input means 36 has just placed a positive potential to center tap 34 of winding 28. This positive potential is immediately applied through the winding 28 over lines 24 and 26 and thence, respectively, through windings 20 and 22. Capacitor 38 serves to provide transistor 16 with a positive potential at its base to firstly initiate current conduction. The regenerative action above referred to then completes the switching action making transistor 16 conductive and transistor 14 nonconductive.

Figure 2:
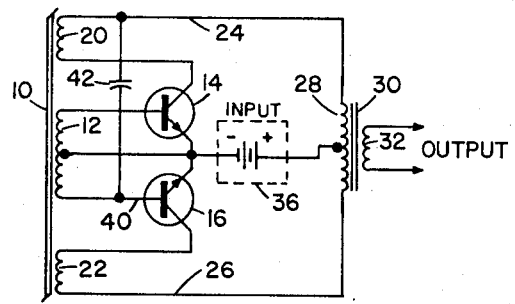
FIG. 2 is a schematic diagram of a variation of the FIG. 1 of the present invention shown in a voltage inverter circuit having current feedback.

Referring now to FIG. 2 there is shown an identical voltage inverter circuit except that the starting circuit, consisting of capacitor 42 is connected between the control input on line 40 of transistor 16 to feedback line 24 rather than to feedback line 26 (FIG. 1). Operation of the circuit is identical as above described.

Figure 3:
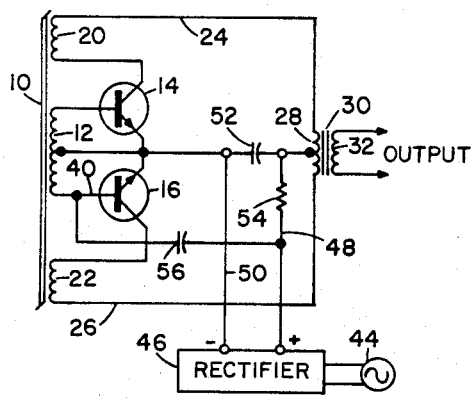
FIG. 3 is a schematic diagram of a second embodiment of the present invention wherein a voltage inverter circuit having current feedback has a starting circuit connected to an unfiltered voltage of the power supply for repetitively receiving power supply transients.

Referring now to FIG. 3 there is shown the FIG. 1 voltage inverter circuit with yet another oscillation initiating or starting circuit. The input means 36 of FIG. 1 consists of AC source 44 supplying AC current to a rectifier 46. Rectifier 46 in turn supplies positive and negative voltages over lines 48 and 50, respectively, to charge capacitor 52, the rectified DC voltage is supplied to inverter circuit as means 36 supplies its voltage. Current limiting impedance 54 may be added to the circuit.

The starting circuit consists of capacitor 56 connected between input line 40 of transistor 16 and positive supply-voltage line 48. The unfiltered full-wave rectified positive potential supplied over line 48 is first passed by capacitor 56 causing a positive potential to firstly momentarily appear on line 40 for initially making transistor 16 conductive. The rising wave fronts of the rectified AC voltage acts as initiating pulses, and forces transistor 14 to nonconduction.

Figure 4:
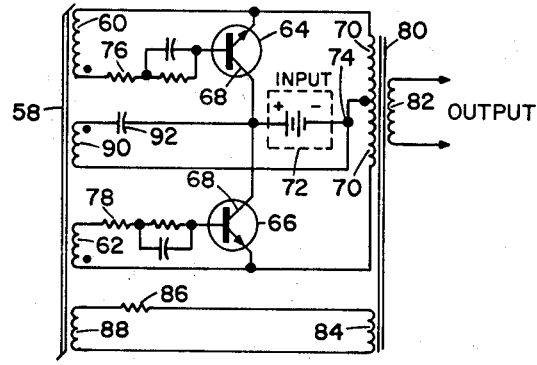
FIG. 4 illustrates a third embodiment of the present invention shown incorporated into a voltage feedback type voltage inverter and utilizing an auxiliary winding on a saturable core for coupling a current pulse to a base drive circuit only when starting the circuit.

Referring now to FIG. 4 there is shown a voltage inverter utilizing voltage feedback; that is, the feedback drive to the transistor switches is proportional to the output voltage amplitude. This circuit includes a saturable core 58 having windings 60 and 62 respectively connected across the base-emitter portions of transistors 64 and 66. Transistor switch collector electrodes 68 are connected together and to the positive end of battery 72. Battery 72 has its negative terminal connected to tap 74 of winding 70. Each of the transistors has a base input circuit 76 and 78 respectively connecting the base electrode to the windings 60 and 62. Winding 70 is wound on a linear transformer core 80 which also has output winding 82 wound thereon.

The inverter circuit is completed by the voltage feedback loop including winding 84 on transformer core 80, limiting resistor 86 and winding 88 on saturable transformer core 58. When the circuit is operating, i.e., recurrently switching conduction between transistors 64 and 66, causing the resultant output signal in winding 82 also induces a signal in winding 84. Such induced signal is transferred through the loop to winding 88, thence through core 58, back to windings 60 and 62 for providing base drive to transistors 64 and 66 to sustain the oscillations.

The improvement provided by this invention in the just described circuit includes the provision of additional winding 90 on core 58. Winding 90 is connected across input source 72 through capacitor 92. It is to be appreciated that when the circuit is operating with battery 72 connected as shown, capacitor 92 will be fully charged thereby blocking any currents, except for reactive non-power consuming voltage changes, or signals induced in winding 90 therefore for all practical purposes effectively disconnecting capacitor 92 and winding 90 from the inverter circuit. However, when battery 72 is first connected to the circuit, a positive voltage is supplied to capacitor 92 which causes a transient signal to be provided to winding 90, which in turn is transferred through windings 60 and 62 to the base drive circuits of transistors 64 and 66. Both windings 60 and 62 are polarized in the same direction therefore a positive signal may be induced in winding 60 and passed through base circuit 76 to first turn on transistor 64 to current conduction. In a similar manner a negative voltage is passed by winding 62 through base drive circuit 78 to provide a current cutoff drive to transistor 66. In this manner transistor 64 will always start conducting first whenever the voltage inverter circuit is initially started.

Figure 5:
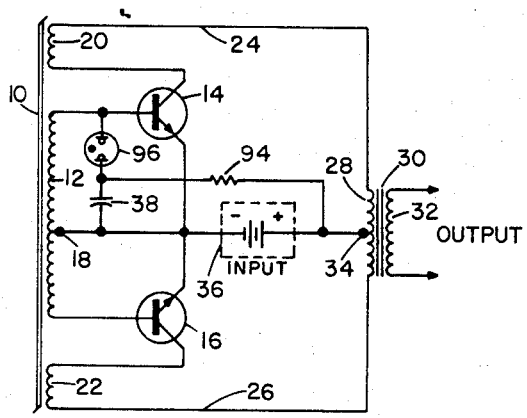
FIG. 5 illustrates a fourth embodiment of the invention using a negative resistance element in the starting circuit.

The FIG. 5 current feedback voltage inverter circuit operation is now described. When input means 36, indicated by a battery, in this circuit is initially turned on, capacitor 38 rapidly charges through resistor 94. Capacitor 38 soon charges to the avalanche breakover voltage of the negative resistance element 96, as shown as a neon bulb, then rapidly discharges therethrough due to the negative resistance characteristics of the neon bulb into the base of the transistor 14 driving it to current conduction turning on the inverter operation. This starting network can also be used as a time delay network to start the inverter at some time after the power supply is turned on; the relay in turn on time is dependent upon the RC time constant of the resistor 94 capacitor 38 combination. Negative resistance device 96 is shown as a neon bulb, but can be any electrical component with this type of characteristics. For example, it could be a four-layer diode, three-layered trigger device, or the emitter-collector portion of a transistor. Due to the fact that there is no DC path from the positive to the negative side of battery source 36 there is negligible power drain by the starter circuit after the inverter is in operation. The circuit is very positive in its operation in the sense that if the inverter does not start with the initial pulse after the power supply is turned on subsequent pulses are immediately generated until the inverter starts.

Figure 6:
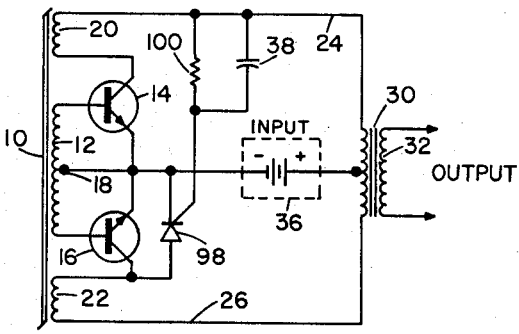
FIG. 6 illustrates another embodiment using an SCR in the starting circuit.

The operation of the circuit shown in FIG. 6 is as follows: When the inverter input means or power supply 36 is first turned on, both lines 24 and 26 become positive with respect to center tap 18. When this action occurs, capacitor 38 makes the gate electrode of SCR 98 positive with respect to center tap 18 by passing the voltage from line 24. The anode voltage of SCR 98 is also positive with respect to center tap 18. Thus SCR 98 becomes conductive drawing current through winding 22 driving transistor 16 to current conduction through inductive action of windings 22 and 12A. This action starts the inverter operation. When transistor 16 conducts, SCR 98 will become and remain non-conductive only if $V_{CE(SAT)}$ of transistor 16 or other switch means is less than the cathode to anode voltage required to maintain holding current in SCR 98. After the square loop transformer 10 has switched magnetic states and transistor 14 becomes conductive, the voltage on capacitor 38 biases the gate of SCR 98 negative with respect to the cathode, keeping SCR 98 extinguished or non-conductive. Therefore, the only time that SCR 98 can be conductive is when the circuit has not started. The reason for resistor 100 in FIG. 6 is to keep capacitor 38 discharged until turn on by means 36. It is necessary that transistor 16 become conductive to saturation during the first half-cycle of operation.

What is claimed is:
1. A voltage-inverter circuit having a starting circuit which draws negligible current once the inverter circuit oscillations have been initiated, including in combination,
   a first transformer having a saturable magnetic core with first and second saturating windings, each winding having first and second ends, a third winding with a center-tap and opposite-end connections,
   a second transformer having a linear magnetic core with a primary winding having a center-tap and two end connections and an output winding,
   first and second semiconductor devices each having first, second and third electrodes, said second electrode being a control electrode for controlling the electrical conductivity of said device between said first and third electrodes,
   said third electrodes being connected together and to the center-top connection on said first transformer,
   DC input means connected between said third electrodes and said center-tap connection on said second transformer,
   said two end connections on said second transformer being connected respectively to said first ends of said first and second saturating windings on said first transformer, said second ends of said first and second windings connected respectively to said first electrodes of said first and second semiconductor devices, respectively,
   said second electrodes of said first and second semiconductor devices being connected respectively to said opposite end connections of said third winding on said first transformer,
   a starting circuit comprising a capacitor having one end connected to said third electrodes and a second end, a resistor connected between said second end and said center-tap connection on said second transformer, and a negative resistance device interconnected between said second electrode of said first transistor and said second end of said capacitor.
2. The subject matter of claim 1 wherein said negative resistance device is a neon tube.

References Cited
UNITED STATES PATENTS

| | | | |
|---|---|---|---|
| 3,085,211 | 4/1963 | Jensen et al. | 331—113.1 |
| 3,159,799 | 12/1964 | Cooper | 331—113.1 |
| 3,247,466 | 4/1966 | Mayer | 331—113.1 |
| 3,345,580 | 10/1967 | Tracy | 331—113.1 |

FOREIGN PATENTS

| | | |
|---|---|---|
| 383,286 | 10/1932 | Great Britain. |
| 1,254,327 | 1/1961 | France. |

JOHN KOMINSKI, *Primary Examiner.*